Figure 1:
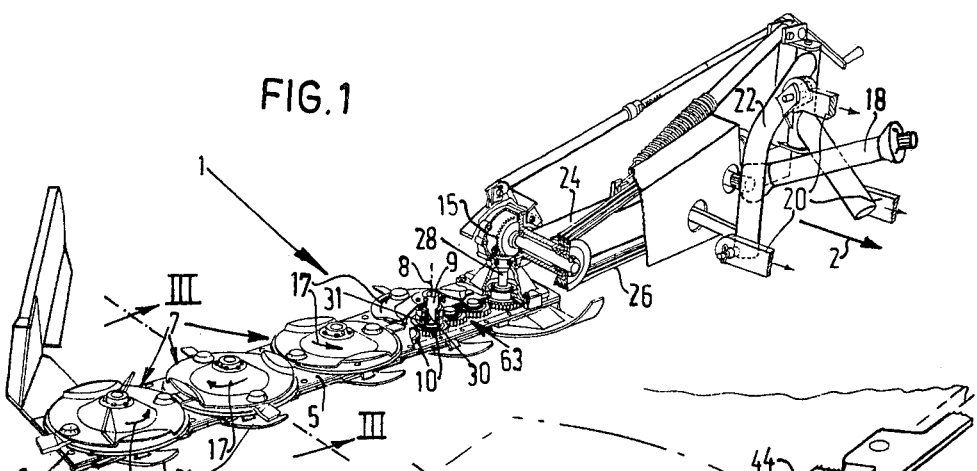

United States Patent [19]

Oosterling et al.

[11] 4,103,476

[45] Aug. 1, 1978

[54] MOWING DEVICE

[75] Inventors: Pieter Adriaan Oosterling; Hendricus Cornelis van Staveren, both of Nieuw-Vennep, Netherlands

[73] Assignee: Multinorm B.V., Nieuw-Vennep, Netherlands

[21] Appl. No.: 737,899

[22] Filed: Nov. 2, 1976

[30] Foreign Application Priority Data

Nov. 28, 1975 [NL] Netherlands ............... 7513925

[51] Int. Cl.² .................................. A01D 75/30
[52] U.S. Cl. ............................. 56/13.6; 56/295
[58] Field of Search .............. 56/13.6, 192, 6, 295

[56] References Cited

U.S. PATENT DOCUMENTS

| 3,469,378 | 9/1969 | Heesters et al. | 56/13.6 |
| 3,513,648 | 5/1970 | Kline et al. | 56/13.6 |
| 3,950,923 | 4/1976 | Martensen et al. | 56/6 |

Primary Examiner—Jay N. Eskovitz
Attorney, Agent, or Firm—John P. Snyder

[57] ABSTRACT

A mowing device comprises a housing extending transversely of the direction of movement of said device, a plurality of cutting members rotatably journalled on said housing and a driving gear accommodated in said housing for driving the cutting members, each cutting member comprising at least one ring skimming the top side of the housing and at least one cutter fastened to the periphery and the top side of said ring. In order to prevent that the ring of the rotating cutting member cuts into the soil when the mowing device strikes a small hill, a ground scanner is secured to the housing and extends forwardly away from the housing beneath a cutting member.

5 Claims, 6 Drawing Figures

MOWING DEVICE

The invention relates to a mowing device comprising a housing extending transversely of the direction of movement of said device, a plurality of cutting members rotatably journalled at said housing and a driving gear accommodated in said housing for driving the cutting members, each cutting member comprising at least one ring skimming the top side of the housing and at least one cutter fastened to the periphery and the top side of said ring.

Such a mowing device is known from Dutch Pat. application No. 7317816. Because each cutter is fastened to the top side of the ring of the cutting member, the ring can sweep along the top side of the housing so that stones with their inherent risk of damaging are prevented from penetrating between the housing and the cutting member. On uneven fields this mowing device involves the drawback that the ring of the rotating cutting member cuts into the soil when the mowing device strikes a small hill. In order to obviate this drawback the mowing device according to the invention is characterized by at least one ground scanner secured to the housing and extending forwardly away from the housing beneath a cutting member. When the ground scanner encounters a hill of earth, it locally lifts the housing and thus prevents the ring of the cutting member from penetrating into the soil. It should be noted that a mowing device comprising a skid or ground support extending forwardly from the housing and beneath the cutting member is generally known, for example, from U.S. Pat. No. 3,507,102, but the combination thereof with a ring of a cutting member skimming the housing with the cutter on the top side of said ring is new.

The abovementioned and further features of the invention will be described more fully hereinafter with reference to a drawing.

Figure 2:
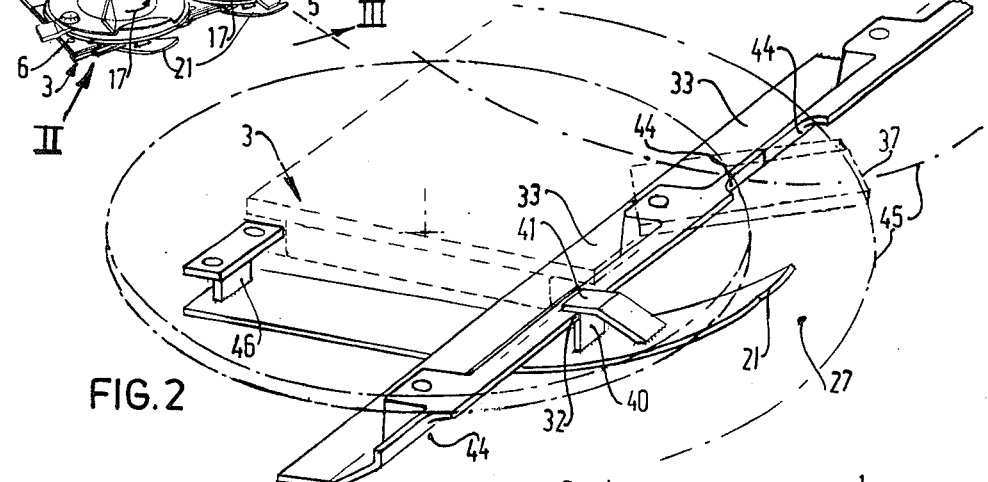
Figure 3:
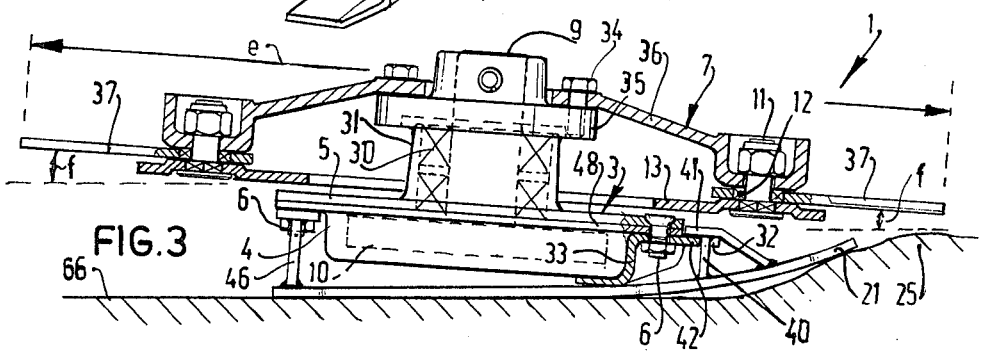
Figure 5:
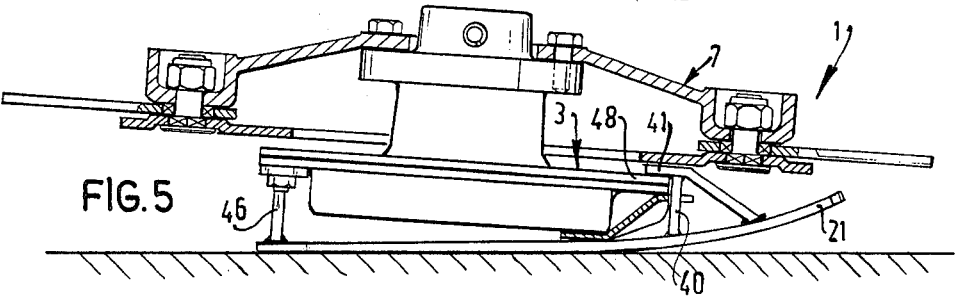
Figure 4:
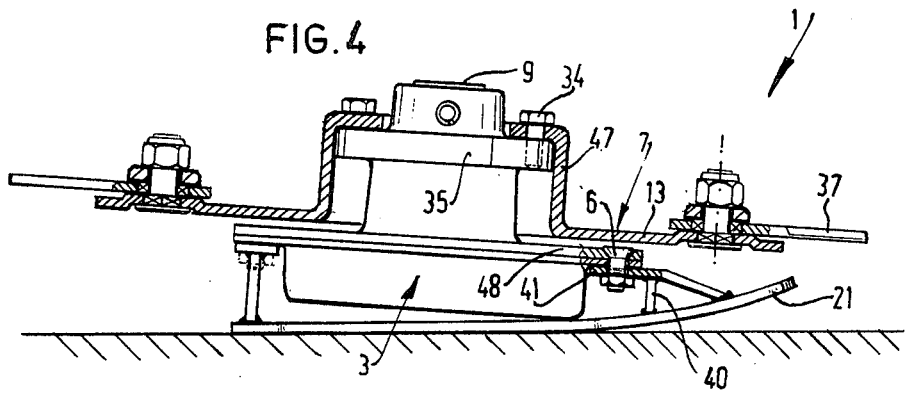
Figure 6:
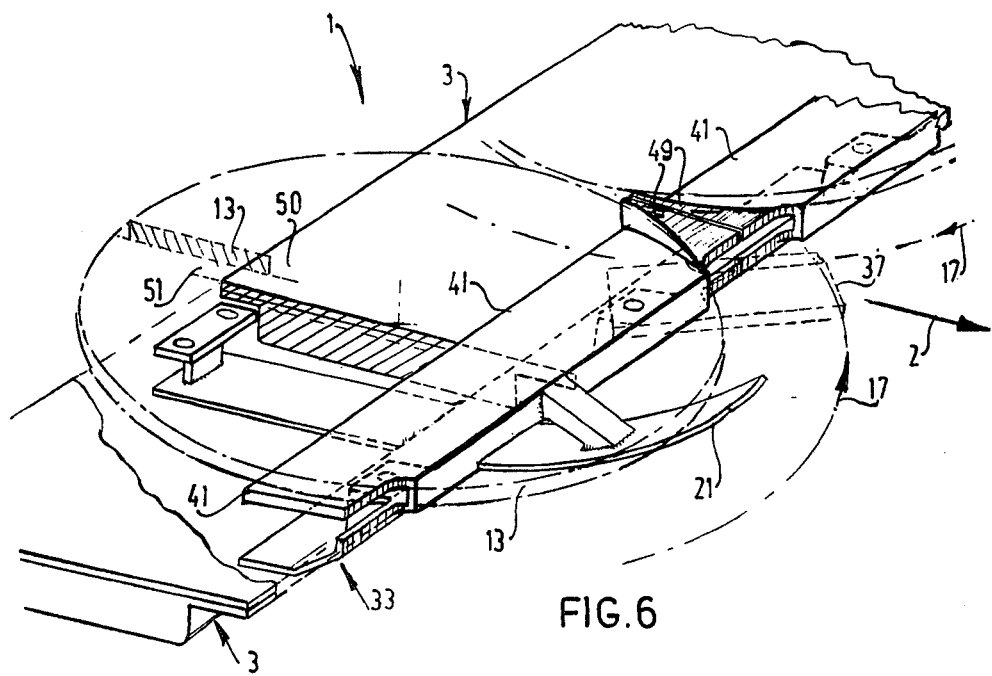

In the drawing:

FIG. 1 is a perspective view, partly broken away, of a mowing device embodying the invention, FIG. 2 is a perspective view of a detail II in FIG. 1 on an enlarged scale, FIG. 3 is a sectional view taken on the broken line III—III in FIG. 1, FIGS. 4 and 5 are sectional views like FIG. 3 of different embodiments of the device in accordance with the invention and FIG. 6 is a perspective view like FIG. 2 of a further variant of the mowing device embodying the invention.

The mowing device 1 shown in FIG. 1 is connected through an auxiliary frame 24 with a framework 22 suspended to the hitch of a tractor (not shown) and is driven through a bevel gear wheel system 15 and a belt drive 26 via a universal shaft 18 by the power take-off shaft of the tractor.

The mowing device 1 according to the invention comprises a housing 3 extending transversely of its direction of movement 2 and having the shape of a flat, elongated beam and mainly comprising a trough 4 and a cover 5 fastened thereto by bolts 6. The housing 3 holds a plurality of rotatable cutting members 7 adapted to rotate about upright shafts 8. The cutting members 7 are disposed near and above the housing 3 and are adapted to rotate pairwise in opposite directions 17. Each cutting member 7 is fixed through a shaft 9 to a gear wheel 10 of a driving gear 63 accommodated in the housing 3 and comprising a series of gear wheels 10 and being driven through a shaft 28 by the bevel gear wheel system 15. The shaft 9 of each cutting member 7 is rotatably journalled in an upright collar 31 of the cover 5 in a bearing 30. Each cutting member 7 comprises a disc 36 fastened by means of screws 34 to a hub 35 and a ring 13 fastened beneath the former by means of bolts 11 and spacer rings 12, between which one or more, for example, two cutters 37 are fastened. The cutters 37 sweep around between the disc 36 and the ring 13 of adjacent cutting members 7 without touching them, for which purpose the discs 36 have upwardly bulging parts 19. The cutters 37 of neighbouring cutting members 7 are relatively off-set through 90° so that they do not touch one another though the cutter paths overlap one another. Each cutter 37 is freely rotatable about a spacer ring 12.

According to the invention a ground scanner 21 extends forwardly from the housing 3 and beneath at least one of each pair of cutting members 7 and under extreme conditions beneath each cutting member 7. This ground scanner 21 preferably extends beyond the ring 13, but it remains behind the crescent-shaped mowing path 27 of the cutters 37. The ground scanner 21 is mainly formed by an upwardly inclined, curved strip, which is removably fastened to the housing 3. When the ground scanner 21 encounters an earth hill 25, it locally lifts the housing 3. With respect to the housing 3 the ground scanner 21 is fixed in place by means of a wear-resistant strip 33 extending axially along the front rim of the housing 3 and being secured thereto by bolts 6, the strip 33 having a recess 32 engaged by a support 40 of the ground scanner 21. Moreover, a tag 41 is bearing on a forwardly extending rim 42 of the wear-resistant strip 33. Each wear-resistant strip 33 arranged on each cutting member 7 has, at its ends 43, recesses 44, where the cutter paths 45 overlap one another. On the rear side each ground scanner 21 has a support 46 secured by bolts 6 to the housing 3.

In the mowing device 1 shown in FIG. 4 the cutting member 7 comprises a ring 13 skimming the top side of the housing 3 and being fastened by a hub 47 by bolts 34 to the hub 35 of the rotary shaft 9 and cutters 37 fastened to the top side of the ring 13. A tag 41 of the support 40 of the ground scanner 21 is secured by a bolt 6 to the bottom sides of flanges 48 of the housing 3.

The mowing device 1 shown in FIG. 5 differs from that shown in FIGS. 1 to 3 in that the tag 41 of the support 40 is bearing on the top side of the flanges 48 of the housing 3.

The mowing device 1 shown in FIG. 6 differs from that shown in FIGS. 1 to 3 in that the wear-resistant strip 33 and the ground scanner 21 are welded to one another and in that the tags 41 extend in the axial direction of length of the housing 3 substantially up to the neighbouring tags 41. These broad tags 41 satisfactorily cover the gap 51 between the ring 13 and the top side 50 of the housing 3 so that small stones at the front cannot penetrate into the gap 51, whilst behind the tags 41 the gap 51 is appreciably higher. The ends of the tags 41 approached by the cutters 37 in the direction of the arrows 17 have rearwardly rising lugs 49.

In all embodiments shown the structure of the mowing device 1 is low and the shape of the cutting members 7 is such that the mowing device 1 can readily pass beneath the cut crop. The circumferential speed of the cutters 37 is very high, for example, about 80 ms/sec with a path diameter $e$ of 45 to 50 cms.

During the mowing operation the mowing device 1 is held in a position slightly inclined forwardly so that the cutting members 7 are at an angle $f$ to the ground surface 66.

What we claim is:

1. A mowing device comprising in combination:

an elongate housing extending transversely of the direction of travel of the device, said housing presenting a hollow interior of generally rectangular cross section and having a straight forward edge and a top surface;

a plurality of generally vertical shafts journalled in said housing and disposed in spaced relation along the length thereof and in alignment with each other along a line which is rearwardly offset and parallel to said straight forward edge of said housing, each shaft having an upper end projecting through said top surface;

drive means within said interior of the housing for simultaneously rotating all of said shafts and comprising a straight train of generally horizontal gears spaced ones of which are connected to said shafts;

a plurality of cutting assemblies, one mounted on each of said shafts, each cutting assembly comprising a disc secured to the upper end of an associated shaft, a ring carried by said disc and disposed therebelow, and at least one cutter disposed between said disc and ring, said disc being of inverted dishlike configuration with its central region secured to said shaft and having a peripheral edge which projects forwardly beyond said forward edge of the housing and is located above said top surface, said ring being of annular form and being secured peripherally to the peripheral edge of said disc at a level which is spaced slightly above the level of said forward edge of the housing and having a radial thickness such that the ring overlaps and closely overlies said forward edge of the housing to prevent stones or the like from lodging between the cutting assembly and said top surface of the housing, said cutter extending from between the peripheries of said disc and ring radially outwardly therefrom and substantially perpendicular to the axis of its associated shaft to sweep an annular cutting path which projects well forwardly of said forward edge of the housing; and a plurality of ground scanner means each secured to the exterior of said housing for lifting said housing vertically to ride over undulations in ground surface thereby to prevent the rings of the cutting assemblies from penetrating such ground surface, each ground scanner means comprising an elongate shoe underlying said housing substantially directly below the shaft of an associated cutting assembly and having a forwardly projecting portion which extends forwardly and upwardly from beneath the housing to terminate well forwardly of said front edge of the housing and below the periphery of an associated ring of the cutting assembly.

2. A mowing device as claimed in claim 1 wherein each ground scanner means extends further forwardly than its associated ring.

3. A mowing device as claimed in claim 1, wherein each ground means is mainly formed by a narrow, forwardly extending strip.

4. A mowing device as claimed in claim 1 wherein each ground scanner means is removably fastened to the housing.

5. A mowing device as claimed in claim 1 wherein each ground scanner means is fixed in place with respect to the housing by means of a wear-resistant strip extending longitudinally along the forward edge of the housing.

* * * * *